United States Patent
Chen et al.

(10) Patent No.: US 7,321,642 B2
(45) Date of Patent: Jan. 22, 2008

(54) SYNCHRONIZATION SYMBOL RE-INSERTION FOR A DECISION FEEDBACK EQUALIZER COMBINED WITH A TRELLIS DECODER

(75) Inventors: Shidong Chen, Palatine, IL (US); Jilian Zhu, Palatine, IL (US); Xiaojun Yang, Palatine, IL (US)

(73) Assignee: Micronas Semiconductors, Inc., Palatine, IL (US)

( * ) Notice: Subject to any disclaimer, the term of this patent is extended or adjusted under 35 U.S.C. 154(b) by 612 days.

(21) Appl. No.: 10/407,404

(22) Filed: Apr. 4, 2003

(65) Prior Publication Data
US 2003/0214976 A1 Nov. 20, 2003

Related U.S. Application Data

(60) Provisional application No. 60/370,380, filed on Apr. 5, 2002, provisional application No. 60/370,413, filed on Apr. 5, 2002.

(51) Int. Cl.
*H04L 27/06* (2006.01)
(52) U.S. Cl. .................. 375/341; 375/229; 375/354; 375/316; 375/265
(58) Field of Classification Search ............... 375/341, 375/316, 233, 265, 340, 354, 229; 714/792
See application file for complete search history.

(56) References Cited

U.S. PATENT DOCUMENTS

| | | |
|---|---|---|
| 4,567,599 A | 1/1986 | Mizoguchi |
| 4,712,221 A | 12/1987 | Pearce et al. |
| 4,815,103 A | 3/1989 | Cupo et al. |
| 4,833,693 A | 5/1989 | Eyuboglu |
| 4,856,031 A | 8/1989 | Goldstein |
| 4,866,395 A | 9/1989 | Hostetter |
| 4,989,090 A | 1/1991 | Campbell et al. |
| 5,052,000 A | 9/1991 | Wang et al. |
| 5,056,117 A | 10/1991 | Gitlin et al. |
| 5,058,047 A | 10/1991 | Chung |
| 5,127,051 A | 6/1992 | Chan et al. |
| 5,134,480 A | 7/1992 | Wang et al. |

(Continued)

FOREIGN PATENT DOCUMENTS

EP 0524559 B1 5/1997

(Continued)

OTHER PUBLICATIONS

Perry et al., A High Throughput Adaptive DFE for HIPERLAN. Circuits and Systems, 1996. ISCAS '96, 'Connecting the World', 1996 IEEE International Symposium on vol. 2, May 12-15, 1996 pp. 301-304 vol. 2.*

(Continued)

*Primary Examiner*—Mohammed Ghayour
*Assistant Examiner*—Leila Malek
(74) *Attorney, Agent, or Firm*—O'Shea, Getz & Kosakowski, P.C.

(57) ABSTRACT

A digital equalizer for interpreting a digital signal including convolutionally encoded symbols and synchronization symbols outside the convolutional code comprises a combined trellis encoder and DFE. The synchronization symbols are re-inserted into the input of the DFE in order to restore time domain continuity created by removal of the synchronization symbols.

5 Claims, 4 Drawing Sheets

U.S. PATENT DOCUMENTS

| | | |
|---|---|---|
| 5,142,551 A | 8/1992 | Borth et al. |
| 5,210,774 A | 5/1993 | Abbiate et al. |
| 5,278,780 A | 1/1994 | Eguchi |
| 5,311,546 A | 5/1994 | Paik et al. |
| 5,453,797 A | 9/1995 | Nicolas et al. |
| 5,471,508 A | 11/1995 | Koslov |
| 5,506,636 A | 4/1996 | Patel et al. |
| 5,508,752 A | 4/1996 | Kim et al. |
| 5,532,750 A | 7/1996 | De Haan et al. |
| 5,537,435 A | 7/1996 | Carney et al. |
| 5,568,098 A | 10/1996 | Horie et al. |
| 5,568,521 A | 10/1996 | Williams et al. |
| 5,588,025 A | 12/1996 | Strolle et al. |
| 5,619,154 A | 4/1997 | Strolle et al. |
| 5,648,987 A | 7/1997 | Yang et al. |
| 5,668,831 A | 9/1997 | Claydon et al. |
| 5,692,014 A | 11/1997 | Basham et al. |
| 5,757,855 A | 5/1998 | Strolle et al. |
| 5,781,460 A | 7/1998 | Nguyen et al. |
| 5,789,988 A | 8/1998 | Sasaki |
| 5,802,115 A * | 9/1998 | Meyer ................. 375/341 |
| 5,802,461 A | 9/1998 | Gatherer |
| 5,805,242 A | 9/1998 | Strolle et al. |
| 5,828,705 A | 10/1998 | Kroeger et al. |
| 5,835,532 A | 11/1998 | Strolle et al. |
| 5,862,156 A | 1/1999 | Huszar et al. |
| 5,870,433 A | 2/1999 | Huber et al. |
| 5,872,817 A | 2/1999 | Wei |
| 5,877,816 A | 3/1999 | Kim |
| 5,894,334 A | 4/1999 | Strolle et al. |
| 5,995,154 A | 11/1999 | Heimburger |
| 6,005,640 A | 12/1999 | Strolle et al. |
| 6,034,734 A | 3/2000 | De Haan et al. |
| 6,034,998 A | 3/2000 | Takashi et al. |
| 6,044,083 A | 3/2000 | Citta et al. |
| 6,069,524 A | 5/2000 | Mycynek et al. |
| 6,133,785 A | 10/2000 | Bourdeau |
| 6,133,964 A | 10/2000 | Han |
| 6,141,384 A | 10/2000 | Wittig et al. |
| 6,145,114 A | 11/2000 | Crozier et al. |
| 6,154,487 A | 11/2000 | Murai et al. |
| 6,178,209 B1 | 1/2001 | Hulyalkar et al. |
| 6,195,400 B1 | 2/2001 | Maeda |
| 6,198,777 B1 | 3/2001 | Feher |
| 6,219,379 B1 | 4/2001 | Ghosh |
| 6,222,891 B1 | 4/2001 | Liu et al. |
| 6,226,323 B1 | 5/2001 | Tan et al. |
| 6,233,286 B1 | 5/2001 | Wei |
| 6,240,133 B1 | 5/2001 | Sommer et al. |
| 6,249,544 B1 | 6/2001 | Azazzi et al. |
| 6,260,053 B1 | 7/2001 | Maulik et al. |
| 6,275,554 B1 | 8/2001 | Bouillet et al. |
| 6,278,736 B1 | 8/2001 | De Haan et al. |
| 6,304,614 B1 | 10/2001 | Abbaszadeh et al. |
| 6,307,901 B1 | 10/2001 | Yu et al. |
| 6,333,767 B1 | 12/2001 | Patel et al. |
| 6,356,586 B1 | 3/2002 | Krishnamoorthy et al. |
| 6,363,124 B1 | 3/2002 | Cochran |
| 6,411,341 B1 | 6/2002 | De Haan et al. |
| 6,411,659 B1 | 6/2002 | Liu et al. |
| 6,415,002 B1 | 7/2002 | Edwards et al. |
| 6,421,378 B1 | 7/2002 | Fukuoka et al. |
| 6,438,164 B2 | 8/2002 | Tan et al. |
| 6,452,639 B1 | 9/2002 | Wagner et al. |
| 6,466,630 B1 | 10/2002 | Jensen |
| 6,483,872 B2 | 11/2002 | Nguyen |
| 6,490,007 B1 | 12/2002 | Bouillet et al. |
| 6,493,409 B1 | 12/2002 | Lin et al. |
| 6,507,626 B1 | 1/2003 | Limberg |
| 6,535,553 B1 | 3/2003 | Limberg et al. |
| 6,570,919 B1 | 5/2003 | Lee |
| 6,573,948 B1 | 6/2003 | Limberg |
| 6,608,864 B1 * | 8/2003 | Strait ................. 375/233 |
| 6,611,555 B2 | 8/2003 | Smith et al. |
| 6,665,695 B1 | 12/2003 | Brokish et al. |
| 6,724,844 B1 | 4/2004 | Ghosh |
| 6,734,920 B2 | 5/2004 | Ghosh et al. |
| 6,741,664 B1 * | 5/2004 | Cameron ................. 375/341 |
| 6,829,298 B1 | 12/2004 | Abe et al. |
| 7,050,517 B1 * | 5/2006 | Sallaway et al. ........... 375/350 |
| 2001/0038643 A1 * | 11/2001 | McParland ................. 370/487 |
| 2001/0048723 A1 | 12/2001 | Oh |
| 2002/0024996 A1 | 2/2002 | Agazzi et al. |
| 2002/0051498 A1 | 5/2002 | Thomas et al. |
| 2002/0054634 A1 * | 5/2002 | Martin et al. ............... 375/232 |
| 2002/0136329 A1 | 9/2002 | Liu et al. |
| 2002/0154248 A1 | 10/2002 | Wittig et al. |
| 2002/0172275 A1 | 11/2002 | Birru |
| 2002/0172276 A1 | 11/2002 | Tan et al. |
| 2002/0186762 A1 | 12/2002 | Xia et al. |
| 2002/0191689 A1 * | 12/2002 | Xia et al. ................... 375/233 |
| 2002/0191716 A1 | 12/2002 | Xia et al. |
| 2003/0058967 A1 | 3/2003 | Lin et al. |
| 2003/0097634 A1 * | 5/2003 | Feldman et al. ............ 714/795 |
| 2003/0206600 A1 | 11/2003 | Vankka |
| 2004/0057538 A1 | 3/2004 | Sathiavageeswaran et al. |

FOREIGN PATENT DOCUMENTS

| | | |
|---|---|---|
| EP | 0752185 B1 | 7/2002 |
| WO | WO 00/27033 | 5/2000 |
| WO | WO 00/27066 | 5/2000 |
| WO | WO 01/01650 A1 | 1/2001 |
| WO | WO 01/13516 A2 | 2/2001 |
| WO | WO 01/43310 A2 | 6/2001 |
| WO | WO 01/43384 A2 | 6/2001 |

OTHER PUBLICATIONS

De Haan et al. "DeInterlacing-an Overview", Proceedings of the IEEE, vol. 86, No. 9, pp. 1837-1856 (Sep. 1998).

De Haan et al. "De-Interlacing of Video Data", IEEE Transactions on Consumer Electronics, vol. 43, No. 3, pp. 819-824 (Aug. 1997).

Wang et al. "Time-Recursive DeInterlacing for IDTV and Pyramid Coding", Elsevier Science Publishers B. V., vol. 2, No. 3, pp. 365-374 (Oct. 1990).

Demodulation of Cochannel QAM Signals (continued); Error Detection/Correction; pp. 1-3, http://www.appsig.com/papers/1813f/813f_4.html.

Demodulation of Cochannel QAM Signals (continued); Simulation Results; pp. 1-6; http://www.appsig.com/papers/1813f/813f_5.html.

* cited by examiner

SYNCHRONIZATION SYMBOL RE-INSERTION FOR A DECISION FEEDBACK EQUALIZER COMBINED WITH A TRELLIS DECODER

CLAIM OF PRIORITY

This application claims priority from U.S. Provisional Patent Applications Nos. 60/370,380 and 60/370,413 both filed Apr. 5, 2002.

BACKGROUND

Equalizers are an important element in many diverse digital information applications, such as voice, data, and video communications. These applications employ a variety of transmission media. Although the various media have differing transmission characteristics, none of them is perfect. That is, every medium induces variation into the transmitted signal, such as frequency-dependent phase and amplitude distortion, multi-path reception, other kinds of ghosting, such as voice echoes, and Rayleigh fading. In addition to channel distortion, virtually every sort of transmission also suffers from noise, such as additive white gausian noise ("AWGN"). Equalizers are therefore used as acoustic echo cancelers (for example in full-duplex speakerphones), video deghosters (for example in digital television or digital cable transmissions), signal conditioners for wireless modems and telephony, and other such applications.

One important source of error is intersymbol interference ("ISI"). ISI occurs when pulsed information, such as an amplitude modulated digital transmission, is transmitted over an analog channel, such as, for example, a phone line or an aerial broadcast. The original signal begins as a reasonable approximation of a discrete time sequence, but the received signal is a continuous time signal. The shape of the impulse train is smeared or spread by the transmission into a differentiable signal whose peaks relate to the amplitudes of the original pulses. This signal is read by digital hardware, which periodically samples the received signal.

Each pulse produces a signal that typically approximates a sinc wave. Those skilled in the art will appreciate that a sinc wave is characterized by a series of peaks centered about a central peak, with the amplitude of the peaks monotonically decreasing as the distance from the central peak increases. Similarly, the sinc wave has a series of troughs having a monotonically decreasing amplitude with increasing distance from the central peak. Typically, the period of these peaks is on the order of the sampling rate of the receiving hardware. Therefore, the amplitude at one sampling point in the signal is affected not only by the amplitude of a pulse corresponding to that point in the transmitted signal, but by contributions from pulses corresponding to other bits in the transmission stream. In other words, the portion of a signal created to correspond to one symbol in the transmission stream tends to make unwanted contributions to the portion of the received signal corresponding to other symbols in the transmission stream.

This effect can theoretically be eliminated by proper shaping of the pulses, for example by generating pulses that have zero values at regular intervals corresponding to the sampling rate. However, this pulse shaping will be defeated by the channel distortion, which will smear or spread the pulses during transmission. Consequently, another means of error control is necessary. Most digital applications therefore employ equalization in order to filter out ISI and channel distortion.

Generally, two types of equalization are employed to achieve this goal: automatic synthesis and adaptation. In automatic synthesis methods, the equalizer typically compares a received time-domain reference signal to a stored copy of the undistorted training signal. By comparing the two, a time-domain error signal is determined that may be used to calculate the coefficient of an inverse function (filter). The formulation of this inverse function may be accomplished strictly in the time domain, as is done in Zero Forcing Equalization ("ZFE") and Least Mean Square ("LMS") systems. Other methods involve conversion of the received training signal to a spectral representation. A spectral inverse response can then be calculated to compensate for the channel distortion. This inverse spectrum is then converted back to a time-domain representation so that filter tap weights can be extracted.

In adaptive equalization the equalizer attempts to minimize an error signal based on the difference between the output of the equalizer and the estimate of the transmitted signal, which is generated by a "decision device." In other words, the equalizer filter outputs a sample, and the decision device determines what value was most likely transmitted. The adaptation logic attempts to keep the difference between the two small. The main idea is that the receiver takes advantage of the knowledge of the discrete levels possible in the transmitted pulses. When the decision device quantizes the equalizer output, it is essentially discarding received noise. A crucial distinction between adaptive and automatic synthesis equalization is that adaptive equalization does not require a training signal.

Error control coding generally falls into one of two major categories: convolutional coding and block coding (such as Reed-Solomon and Golay coding). At least one purpose of equalization is to permit the generation of a mathematical "filter" that is the inverse function of the channel distortion, so that the received signal can be converted back to something more closely approximating the transmitted signal. By encoding the data into additional symbols, additional information can be included in the transmitted signal that the decoder can use to improve the accuracy of the interpretation of the received signal. Of course, this additional accuracy is achieved either at the cost of the additional bandwidth necessary to transmit the additional characters, or of the additional energy necessary to transmit at a higher frequency.

A convolutional encoder comprises a K-stage shift register into which data is clocked. The value K is called the "constraint length" of the code. The shift register is tapped at various points according to the code polynomials chosen. Several tap sets are chosen according to the code rate. The code rate is expressed as a fraction. For example, a ½ rate convolutional encoder produces an output having exactly twice as many symbols as the input. Typically, the set of tapped data is summed modulo-2 (i.e., the XOR operation is applied) to create one of the encoded output symbols. For example, a simple K=3, ½ rate convolutional encoder might form one bit of the output by modulo-2-summing the first and third bits in the 3-stage shift register, and form another bit by modulo-2-summing all three bits.

A convolutional decoder typically works by generating hypotheses about the originally transmitted data, running those hypotheses through a copy of the appropriate convolutional encoder, and comparing the encoded results with the encoded signal (including noise) that was received. The decoder generates a "metric" for each hypothesis it considers. The "metric" is a numerical value corresponding to the degree of confidence the decoder has in the corresponding hypothesis. A decoder can be either serial or parallel—that is, it can pursue either one hypothesis at a time, or several. One important advantage of convolutional encoding over block encoding is that convolutional decoders can easily use "soft decision" information. "Soft decision" information essentially means producing output that retains information about the metrics, rather than simply selecting one hypothesis as the "correct" answer. For an overly-simplistic example, if a single symbol is determined by the decoder to have an 80% likelihood of having been a "1" in the transmission signal, and only a 20% chance of having been a "0", a "hard decision" would simply return a value of 1 for that symbol. However, a "soft decision" would return a value of 0.8, or perhaps some other value corresponding to that distribution of probabilities, in order to permit other hardware downstream to make further decisions based on that degree of confidence.

Block coding, on the other hand, has a greater ability to handle larger data blocks, and a greater ability to handle burst errors.

The following is a description of an improvement upon a combined trellis decoder and decision feedback equalizer, as described in U.S. patent application Ser. No. 09/876,547, filed Jun. 7, 2001, which is hereby incorporated herein in its entirety. More specifically, the present invention provides an improvement upon a transposed structure for a decision feedback equalizer ("DFE"), as taught by the concurrently filed U.S. Patent Application entitled "Transposed Structure for a Decision Feedback Equalizer Combined with a Trellis Decoder," which is also hereby incorporated herein in its entirety. The transposed structure permits extremely fast and effective ghost cancellation, so that the equalizer provides a high quality signal resolution even during severe noise and channel distortion. However, the transposed filter structure disclosed in that application does not handle the "corner cases," caused by the interruption in the data symbols presented by synchronization symbols in most digital signal. For example, the frame and field sync symbols in a digital television signal interrupt the data symbols. Thus, in order to employ a transposed structure DFE in a digital television receiver there is a need for an improvement upon the transposed filter structure to deal with those corner cases. The present invention is directed towards meeting this need, among others.

SUMMARY OF THE INVENTION

In a first embodiment the present invention provides a synchronization symbol re-inserter, comprising a trellis decoder and a mirrored symbol delay line. The trellis decoder comprises a plurality of decoding stages, each decoding stage having as output intermediate decoded symbols. The mirrored symbol delay line comprises a plurality of 3:1 multiplexers and a plurality of delay devices. Each of the plurality of 3:1 multiplexers has a multiplexer output, and each receives as input the intermediate decoded symbols from a following stage of the trellis decoder, and the intermediate decoded symbols from the current stage of the trellis decoder. For each of the plurality of 3:1 multiplexers, there is a delay device that receives as input one of the plurality of multiplexer outputs, and has a multiplexer output The multiplexer output of each of the delay devices other than a final multiplexer is fed to a following 3:1 multiplexer.

In a second embodiment the present invention provides a digital equalizer for interpreting a digital signal including convolutionally encoded symbols and synchronization symbols outside the convolutional code. The digital equalizer comprises a combined trellis decoder and DFE, wherein the synchronization symbols are re-inserted into the input of the DFE in order to restore time domain continuity created by removal of the synchronization symbols.

BRIEF DESCRIPTION OF THE DRAWINGS

Although the characteristic features of this invention will be particularly pointed out in the claims, the invention itself, and the manner in which it may be made and used, may be better understood by referring to the following descriptions taken in connection with the accompanying figures forming a part hereof.

DETAILED DESCRIPTION OF THE PREFERRED EMBODIMENT

For the purposes of promoting an understanding of the principles of the invention, reference will now be made to the preferred embodiment and specific language will be used to describe the same. It will nevertheless be understood that no limitation of the scope of the invention is thereby intended. Such alternations and further modifications in the invention, and such further applications of the principles of the invention as described herein as would normally occur to one skilled in the art to which the invention pertains, are contemplated, and desired to be protected.

The present invention provides an improvement on a transposed structure for a decision feedback equalizer ("DFE"). The transposed structure permits extremely fast and effective ghost cancellation, so that the equalizer provides a high quality signal resolution even during severe noise and channel distortion. Consequently, such a digital receiver will have clear reception under conditions where prior digital equipment would completely fail. The present invention provides a means to employ a high-performance DFE in a digital television application, by accounting for the interruptions in the data stream that are presented by the synchronization symbols that are used in the industry standard digital television protocols.

Those skilled in the art will appreciate that the synchronization symbols inserted into a digital television signal are outside of the chain coding. That is, the convolutional encoding is performed on the data stream first, and the synchronization symbols are inserted at the appropriate intervals in the resulting symbol stream. Consequently, the synchronization symbols in the received signal represent interruptions that, if not accounted for, will disrupt the temporal continuity of the symbols fed into the DFE.

Conceptually, a DFE needs to continuously take in N×D+M consecutive decoded symbol sequence in each symbol clock cycle and weigh all these symbols to produce the ghost estimate. Typically, each of the N+D+M decoded symbol inputs must incur exactly one more symbol clock cycle delay than the preceding one. This sequential symbol delay relationship is called "temporal continuity." It will be appreciated that, when combined with the trellis decoder, the symbols with same time stamp may change their values because the trellis decoding process may modify some intermediate decoded symbols when they pass the current decoding bank.

In a non-combined DFE an accurate delay line of N×D+M symbols, where the symbols are delayed without changing their values, is sufficient to generate the decoded symbol sequence to be weighted. However, in a combined DFE the first N×D decoded symbols are held in the trellis decoder. When these symbols incur delay, their values are revised and as a result may be changed to symbols that are more likely to correspond to those in the original transmitted signal (according to the optimization assumptions of the decoder). Therefore the subsequent decoded symbols are not simply delayed copies of first decoded symbols, as is in an accurate delay line. The value changes cause the accurate delay line not to work with a combined DFE. On the other hand, regardless of value changes, there is an order in which these N×D decode symbols held in the trellis decoder can be re-arranged so that the consecutive decoded symbols do incur one symbol clock delay. This re-arranged sequence is a value-variable delay line, termed "an equivalent N×D symbol delay line." After the first N×D symbols, there are the remaining M symbols. Each decoded symbol has its final value—the optimal value according to the decoder's solution. These symbols are delayed without value changes, therefore these M symbols compose an accurate delay line, and can be simply generated by a standard delay line. However, the first equivalent N×D symbol delay line is required.

Figure 1:
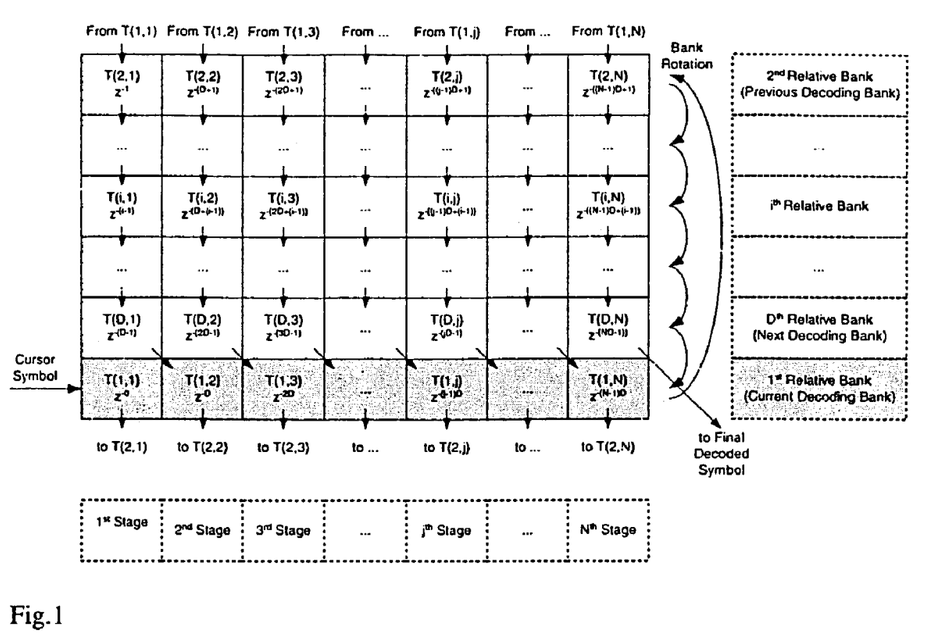
FIG. 1 is an illustration of the equivalent N×D symbol delay line during the normal re-arrangement operation of the trellis decoder in an equalizer according to the present invention.
Figure 2:
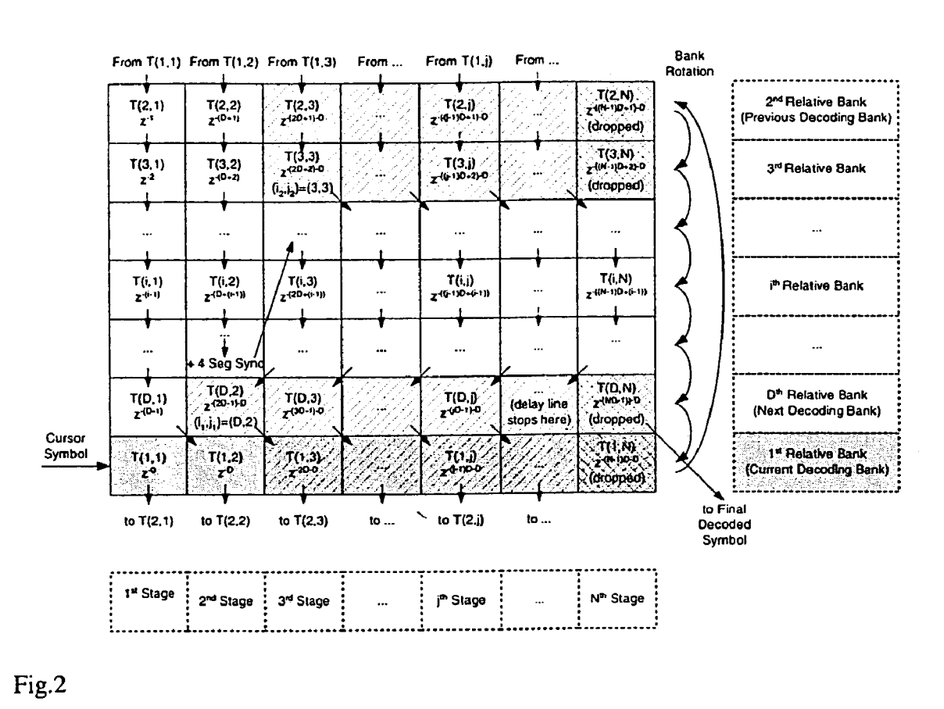
FIG. 2 is an illustration of the equivalent N×D symbol delay line during the re-arrangement operation in segment synchronization-related corner cases in an equalizer according to the present invention.

In a DFE employing a multiple transposed pipeline structure, such as those shown in FIGS. 1 and 2, the required temporal continuity is satisfied if the input to the 1st DFE pipeline (the decoded symbol from the 1st decoding state in the trace-back chain of the current bank) has the same time stamp as the un-decoded symbol being input to the trellis decoder, while the input to the 2d DFE pipeline (normally the decoded symbol from the 2d decoding states of the current bank) has a D symbol clock cycle delay, and so on through the input of the last DFE pipeline (normally the final decoded symbol), which has a N×D symbol delay. There must be exactly D symbol clock cycle delays between the consecutive input signals to a multiple transposed pipeline DFE.

As described in the concurrently filed application entitled "Transposed Structure for a Decision Feedback Equalizer Combined with a Trellis Decoder," the N+1 decoded symbols fed to the DFE employing the multiple transposed pipeline structure are sufficient to generate all equivalent N×D+M decoded symbol delay lines. It will be appreciated that the N+1 decoded symbols inputs to the multiple transposed pipeline DFE are a sub-sequence of the overall equivalent N×D+M decoded symbol delay line.

In a digital television application, the temporal continuity is broken in the normal re-arranged sequence in several cases by the synchronization symbols inserted into the transmitted symbol stream. Unless these cases are specially handled, this will cause the ghost estimation from the DFE to be erroneous, because the decoded symbols to the DFE filter would appear at incorrect locations, and be weighted by erroneous taps. As previously mentioned, in the ATSC standard, the segment and frame synchronization symbols are outside the convolutional coding. Consequently, the trellis decoder must account for these symbols by interrupting normal operation, so that it is decoding the symbol stream produced by the encoding process. The specific "corner" cases to be specially handled are:

1. The segment synchronization symbols pass the cursor. The cursor symbol has the same time stamp as the currently input un-decoded symbol to the trellis decoder. When this happens the trellis decoder pauses decoding. Thus, the trellis decoder stops taking in new un-decoded symbols, tracing back, and updating the intermediate decoded results held in the inner decoding stages of its current bank. Nevertheless, it continues rotating banks. The suspension of decoding obviously breaks the temporal continuity in the resulting intermediate decoded results from the "frozen" decoding bank.

2. The "tail" region following the segment synchronization symbols. Once the segment synchronization symbols pass the cursor the trellis decoder resumes the decoding process. However, during the following N×D symbols the banks that were interrupted by the segment synchronization symbols do not keep a normal trace-back chain, wherein the time delay between two symbols stored in consecutive stages is equal. Consequently, when one of these banks is rotated to the current decoding bank the output intermediate decoded results contained in the trace-back chain break the continuity rule.

3. When the frame synchronization symbols arrive at the cursor. During the following N×D symbol clock cycles the trellis decoder pauses its decoding process. It stops taking in new un-decoded symbols, rotating banks, tracing back, and shifting the remaining intermediate decoded results held in the inner decoding stages of its current bank. Since no new symbol is decoded and no new decoded symbol is moved into the inner decoding stages the intermediate decoded results held in all banks become obsolete one by one, one in every symbol clock cycle. After N×D symbol clock cycles, the intermediate decoded results held in all banks have become obsolete for feeding to the first part of the DFE. These obsolete decoded symbols have time stamps earlier than frame synchronization, and have passed off their time window to feed into any DFE tap, when the DFE is no longer than the frame synchronization, which is the normal situation.

4. During the frame synchronization period the trellis decoder still pauses its decoding process; it does not take in new un-decoded symbols, rotate banks, or trace back or update the intermediate decoded results held in the inner decoding stages of its current bank. All the intermediate decoded symbols held in the trellis decoder become obsolete for feeding to the DFE.

5. After the frame synchronization symbols pass the cursor. During the following N×D symbol clock cycles after the last frame synchronization symbol passes the cursor the trellis decoder resumes the decoding process. It takes in new un-decoded symbols, and resumes rotating banks and tracing back among the inner decoding stages of its current bank. Since new symbols are decoded and new decoded symbols are moved into the inner decoding stages, the number of obsolete intermediate decoded results in all banks decreases by one in every symbol clock cycle. After N×D symbol clock cycles all of the obsolete decoded symbols are moved out of the trellis decoder, which then returns to the normal decoding process.

A mechanism is required to handle the above corner cases (together with the normal decoding process), which goes between the trellis decoder and the DFE. The normal decoding process is handled by a method of normal re-arrangement, while the corner cases are handled by separate methods. These methods mainly involve the re-insertion of synchronization symbols back into the re-ordered decoded symbol sequence generated by the normal re-arrangement method.

It will be appreciated that all cases fall into one of three general categories: normal operation, segment synchronization related corner cases, and frame synchronization corner cases. The following methods handle each of these three categories.

1. Normal Re-Arrangement

During normal operation all N×D inner intermediate decoded symbols held in the trace-back chains are re-arranged into an equivalent N×D symbol delay line in the order they went into the trellis decoder as input, as shown in FIG. 1. As shown in FIG. 1, the current decoding bank is denoted as "relative bank #1," the previous bank as "relative bank #2," and so on through bank #D—which, of course, is also the next decoding bank. $T(i, j)$ denotes the intermediate decoded symbol stored in the $j^{th}$ stage of the trace-back chain, in relative bank #i, $1 \leq i \leq D$, $1 \leq j > N$. In will be appreciated that the symbol $T(i, j)$ incurs $(j-1)D+(i-1)$ symbol delays after the cursor symbol. Consequently, the arrangement order is given by the syntax:

```
Equivalent_N x D_symbol_delay_line( )
{
    for (j=1; j<N+1; j++)
        for (i=1; i<D+1; i++)
            T(i,j);
}
```

The data stored in the same stage of the trace-back chains (D symbols per stage) composes a temporally continuous delay line, shown by the arrow chain in FIG. 1. The decoded symbols of this equivalent N×D symbol delay line are the first N×D symbols fed to the DFE.

2. Segment Synchronization Related Corner Cases

Firstly, the N×D inner intermediate decoded symbols in the trellis decoder are re-arranged into the equivalent N×D symbol sequence by the method of normal re-arrangement. The sequence is then divided into two pieces by the segment synchronization symbols—which are, of course, skipped by and not actually held within the trellis decoder. The missing segment synchronization symbols must be re-inserted between these two pieces to restore the temporal continuity of the delay line. In the process, the same number of symbols in the earlier piece—preferably, the earliest symbols—must be dropped to preserve the N×D symbol length of the delay line.

The above process produces a delay chain on the layout of the intermediate decoded symbols held in the trellis decoder, as shown in FIG. 2. Due to bank jumping the decoded symbols stored in the trace-back chains in jumped banks that arrived before the segment synchronization symbols have an extra D symbol delays, shown as cells with slanted line shading in FIG. 2. It will be appreciated that the symbol stored in cell $T(i, j)$ incurs $(j-1)D+(i-1)+D$ symbol clock cycle delays after the cursor symbol if it is one of these symbols, otherwise it incurs $(j-1)D+(i-1)$ symbol clock cycle delays. In an ATSC standard system the segment synchronization is 4 symbols long. In the layout of the current symbol, if the symbol stored in cell $T(\mathbf{1, 1})$ when the last segment synchronization symbol came to the cursor has moved on to the cell denoted by $T(i_1, j_1)$, (cell $T(D, \mathbf{2})$ in the example shown in FIG. 2), and the symbold stored in cell $T(\mathbf{1, 1})$ when the first segment synchronization symbol came to the cursor has been moved to the cell denoted by $T(i_2, j_2)$, (cell $T(\mathbf{3, 3})$ in the example shown in FIG. 2), the equivalent N 3 D symbol delay line is given by the syntax:

```
Equivalent_N x D_symbol_delay_line ( )
{
    for (j=1; j<j₁; j++) {
        for (i=1; i<N+1; i++) {
            T(i,j);
        }
    }
    j = j₁;
    for (i=1; i<i₁; i++) {
        T(i,j);
    }
    segment_sync_pattern;
    j= j₂;
    for (i=i₂+1; i<D+1; i++) {
        if (T(i,j-1) is a symbol which arrived before segment sync
            in the jumped banks)
            T(i,j-1);
        else
            T(i,j);
    }
    for (j=j₂+1; j<N+1; j++) {
        for (i=1; i<D+1; i++) {
            if (T(i,j-1) is a symbol which arrived before segment sync
                in the jumped banks)
                T(i,j-1);
            else
                T(i,j);
        }
    }
}
```

In the example shown in FIG. 2 the dropped cells are $T(\mathbf{1},N)$, $T(\mathbf{2},N)$, $T(\mathbf{3},N)$, and $T(D\mathbf{4},N)$, shown as cells with a grid shading. The so acquired equivalent N×D symbol delay line, illustrated in FIG. 2 by the chain of arrows, is continuous in the time domain.

3. Frame Synchronization Related Corner Cases

Firstly, the N×D inner intermediate decoded symbols in the trellis decoder are again re-arranged into the equivalent N×D symbol sequence by the normal re-arrangement process. Then the corner cases related to frame synchronization must be addressed in two ways, separately.

Figure 3:
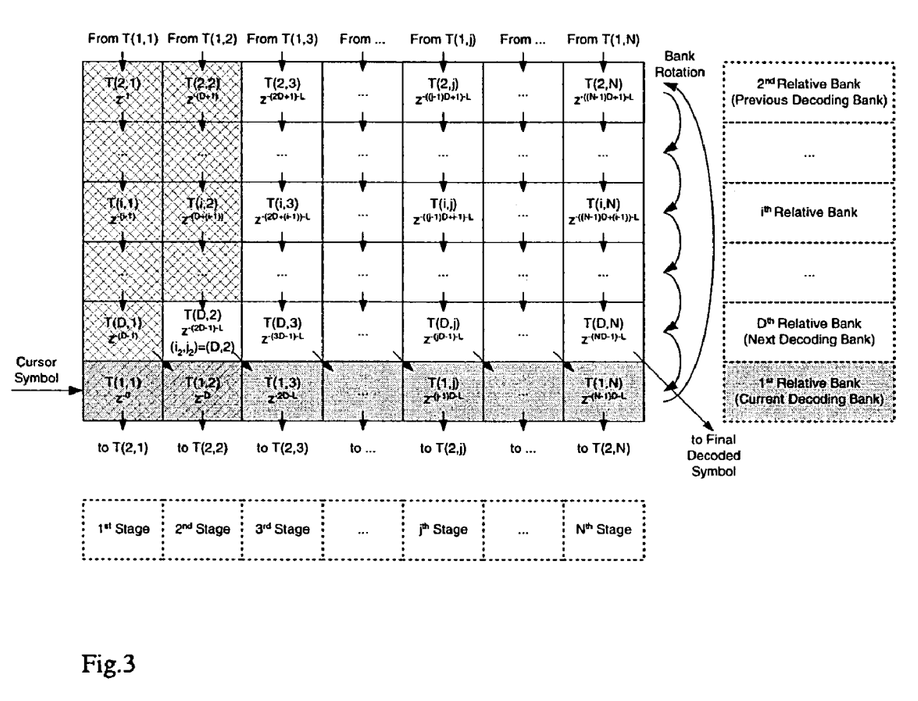
FIG. 3 is an illustration of the equivalent N×D symbol delay line during the re-arrangement operation in frame synchronization-related corner cases in an equalizer according to the present invention.

This re-arrangement sequence, which occurs while the frame synchronization symbols are passing the cursor, is in itself an equivalent temporally continuous delay line, but it is frozen instead of being shifted. So the equivalent N 3 D symbol delay line is built from the received frame synchronization symbols followed by the equivalent N 3 D symbol sequence, then cut down to N 3 D symbols by dropping the other earliest symbols. If, in the layout of the current symbol the last data symbol before the frame sync is denoted by $T(i_1, j_1)$, (cell $T(D, \mathbf{2})$ in the example shown in FIG. 3), the equivalent N 3 D symbol delay line is given by the syntax:

```
Equivalent_N x D_symbol_delay_line ( )
{
    arrived_frame_sync_sequence;
    j = j₁;
    for (i =i₁; i<D+1; i++) {
        T(i,j);
    }
    for (j=j₁+1; j<N+1; j++) {
        for (i=1; i<D+1; i++) {
            T(i,j);
        }
    }
}
```

The other corner case related to frame synchronization happens just after the last frame synchronization symbol passes the cursor. This means that the cursor symbol is a data symbol arrived after the frame synchronization symbols. The trellis decoder resumes its decoding process. The equivalent symbol sequence generated by the normal re-arrangement method is not in itself an equivalent delay line. This sequence is broken into two equivalent delay lines with a gap between them caused by the frame synchronization symbols—which are, of course, skipped by and not actually held within the trellis decoder. The missing frame synchronization symbols must be re-inserted back into the gap between these two pieces to restore the temporal continuity of the equivalent delay line. Then it is cut down to desired length of N×D by dropping the earlier symbols. The layout of intermediate decoded symbols held in the trellis decoder is shown in FIG. 3. The earlier piece of the delay line includes the intermediate decoded symbols having an earlier time stamp than frame synchronization symbols, shown as cells without grid in FIG. 3. The later piece is shown as cells with grid shading. The cells in the earlier piece incur an additional L symbol delay, where L denotes the length of frame synchronization plus that of two neighboring segment synchronizations. Assume the last data symbol before the frame synchronization is now moved to $T(i_2, j_2)$ in the layout of the current symbol, the equivalent N×D symbol delay line is given by the syntax:

```
Equivalent_N × D_symbol_delay_line ( )
{
    for (j=1; j<j2; j++) {
        for (i=1; i<N+1; i++) {
            T(i,j);
        }
    }
    j = j2;
    for (i =1; i<i2+1; i++) {
        T(i,j);
    }
    remaining_frame_sync_sequence;
}
```

Once again, the equivalent N×D symbol delay line is illustrated by the chain of arrows in FIG. 3, and is continuous in the time domain.

Thus, the equivalent decoded symbol delay lines provided above always give N×D valid intermediate decoded symbols that satisfy the continuity requirement. When the N×D+M tap DFE is implemented in a transverse structure the equivalent N×D delay line is extended by an M-tap accurate delay line that shifts the final decoded symbol without modification. All of these N×D+M symbols are fed into the DFE. When it is implemented in a multiple transposed pipeline structure, only N+1 decoded symbols are fed into the DFE—specifically, those with a delay of 0 (that is, the first symbol), D, 2D . . . , and so on through N×D, which is the final decoded symbol.

Figure 4:
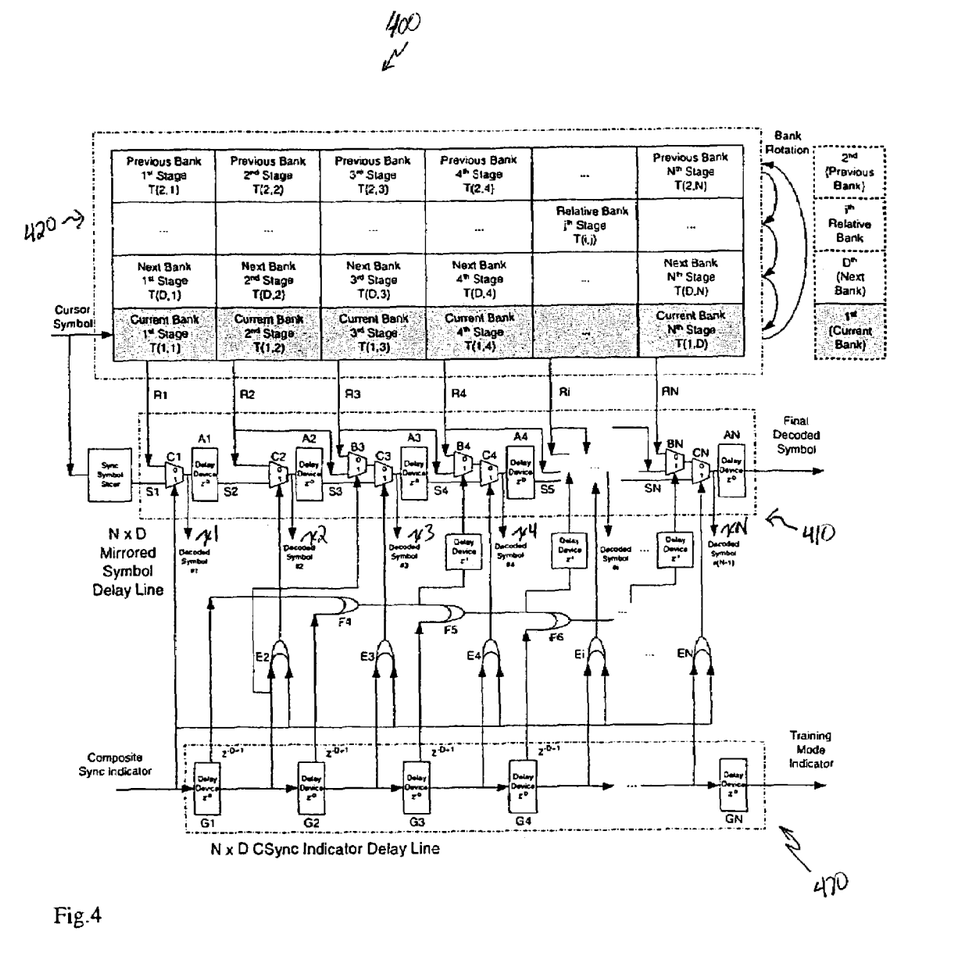
FIG. 4 is a diagram of a first embodiment synchronization symbol re-inserter according to the present invention.

One exemplary structure that employs these methods of covering the above corner cases in digital television receivers, such as ATSC DTV receivers, is shown in FIG. 4, and indicated generally at 400. The synchronization symbol re-inserter 400, which combines the DFE (not shown) and the trellis decoder 420, comprises a mirrored symbol delay line 410. The mirrored symbol delay line 410 takes in only N intermediate decoded symbols from the trace-back chain of the current bank in the trellis decoder, and outputs equivalent N×D decoded symbol delay line that satisfies the continuity requirement. The mirrored symbol delay line 410 comprises N delay devices, shown as A1 through AN in FIG. 4, and no more than 2N 2:1 multiplexers, labeled B3 through BN and C1 through CN in FIG. 4. Each of the delay devices A1-AN delays a decoded symbol by D symbol clock cycles. All of the multiplexers except C1 and C2 are organized into pairs to form 3:1 multiplexers; as shown, B3 and C3 together form a single 3:1 multiplexer, B4 and C4 form a 3:1 multiplexer, and so on through BN and CN. Each pair of adjacent delay devices after the first pair (that is, each pair starting with A2 and A3, inclusive) is cascaded through one of the 3:1 multiplexers.

When the output symbol (Si, i=2, 3, . . . , N) of the previous delay device (A(i−1), i=2, 3, . . . , N) is indicated as a synchronization symbol the multiplexer Ci selects this delayed synchronization symbol. Otherwise, when in segment related corner cases, if the current decoding bank is one of the jumped banks, the 3:1 multiplexers Bi and Ci switch to the intermediate decoded symbol from the neighboring later stage (R(i−1), i=2, 3, . . . , N) when the symbol stored in the current stage (Ri, i=2, 3, . . . , N) arrived before the segment synchronization symbols. Otherwise, the 3:1 multiplexers Bi and Ci pass the output symbol of the current stage from the trellis decoder. It will be appreciated that the synchronization symbol has the highest priority, followed by the symbol from the neighboring later stage, while the symbol from the current stage has the lowest priority. Symbols with the higher priority always override the lower priority symbols.

The N multiplexed outputs (xi, i=2, 3, . . . , N) are fed into the next delay device (A(i), i=2, 3, . . . , N), and are also the input symbols fed to the multiple transposed pipeline DFE. The first multiplexer C1 follows no previous delay device, so one of its symbol inputs comes from the synchronization symbol generator, which typically generates the predefinded frame or segment synchronization symbols when their stamp arrives.

The synchronization re-inserter 400 further comprises a composite synchronization indicator 470. The composite synchronization indicator 470 is an independent single bit delay line, also used to determine whether the output symbol (S(i), i=2, 3, . . . , N) of a delay device (A(i−1), i=2, 3, . . . , N) is a synchronization symbol. All synchronization symbol indicators, including the segment synchronization indicator and the frame synchronization indicator, are connected to a logical or-gate to obtain a composite synchronization indicator. The composite synchronization indicator is then delayed by the N×D composite synchronization symbol indicator delay line 470 to give those delayed versions that match the output symbols (S(i), i=2, 3, . . . , N) of the delay devices in the mirrored symbol delay line 410. Each of these delayed versions indicates whether the output symbol (S(i), i=2, 3, . . . , N) of a delay device is a synchronization symbol. They are connected to a logical or-gate with the original version, respectively, to select the delayed synchronization symbol (S(i), i=2, 3, . . . , N). The segment synchronization indicator and its delayed versions are connected by an or-gate by cascading or-gates (F(i), i=4, 5, . . . , N), to decide whether it is necessary to select the neighboring later stage (R(i−1), i=2, 3, . . . , N) instead of the current stage (R(i), i=2, 3, . . . , N). It will be appreciated that the multiplexer B1 and B2 can be optimized away; this causes the first two stages of the structure 400 to appear irregular.

During the normal re-arrangement process the N×D mirrored symbol delay line 410 keeps a mirrored version of the intermediate decoded symbols held by the trace-back chains of all banks in the trellis decoder. During corner cases, the mirrored symbol delay line 410 inserts the synchronization symbol correctly. Indeed, it is the equivalent N×D decoded symbol delay line. When fed to the transposed DFE only tap 0, D, 2D, . . . (N–1)D (shown as decoded symbol #1, #2, . . . #N respectively in FIG. 4), together with the final decoded symbol are needed.

In the case of an ATSC receiver, there are 12 trellis coding banks, and typically 16 stages of trace-back chains. Such a trellis decoder keeps 192 intermediate decoded results before it gives out the final decoded symbol. So in the above structure there are 16 delay devices, each covering 12 symbol clock cycles. In this case, N is 16 and D is 12 in FIG. 4.

In addition to obtaining the intermediate decoded symbol outputs with re-inserted synchronization symbols this structure has another useful function. It can give out a training mode indicator, which is simply the finally delayed composite synchronization signal. This signal provides an ideal control to switch the equalizer between a training mode and a data directed mode.

While the invention has been illustrated and described in detail in the drawings and foregoing description, the description is to be considered as illustrative and not restrictive in character. Only the preferred embodiments, and such alternative embodiments deemed helpful in further illuminating the preferred embodiment, have been shown and described. It will be appreciated that changes and modifications to the forgoing can be made without departing from the scope of the following claims.

We claim:

1. A synchronization symbol re-inserter for use in a symbol decoder, comprising:
    a trellis decoder, including;
        a plurality of decoding stages for decoding encoded data symbols, each decoding stage having as output intermediate decoded symbols; and
    a mirrored symbol delay line, including;
        a plurality of multiplexers, each multiplexer providing multiplexer output symbols, and each multiplexer receiving as input the intermediate decoded symbols from a following stage of the trellis decoder and the intermediate decoded symbols from a current stage of the trellis decoder; a plurality of delay devices, each delay device receiving as input the multiplexer output symbols from a selected one of the multiplexers and providing corresponding delayed multiplexer output symbols, the delayed multiplexer output symbols of each delay device other than the multiplexer output symbols from a final one of the plurality of multiplexers being fed to a following multiplexer; and
    where when the delayed multiplexer output symbol of one of the plurality of delay devices is a synchronization symbol a following one of the plurality of multiplexers selects the synchronization symbol delayed by the corresponding delay device at the output of the mirrored symbol delay line, and otherwise the plurality of multiplexers provide the intermediate symbol from each of the current stages of the trellis decoder at the output of the mirrored symbol delay line.

2. The synchronization symbol re-inserter of claim 1, where each of the multiplexers comprises a pair of 2:1 multiplexers.

3. The synchronization symbol re-inserter of claim 1, further comprising a composite synchronization indicator that determines whether the output of one of the plurality of delay devices is a synchronization symbol.

4. The synchronization symbol re-inserter of claim 1, further comprising a decision feedback equalizer (DFE) following the trellis decoder.

5. The synchronization symbol re-inserter of claim 4, where the decision feedback equalizer (DFE) comprises a filter having a transposed structure.

* * * * *

UNITED STATES PATENT AND TRADEMARK OFFICE
CERTIFICATE OF CORRECTION

PATENT NO. : 7,321,642 B2
APPLICATION NO. : 10/407404
DATED : January 22, 2008
INVENTOR(S) : Chen et al.

It is certified that error appears in the above-identified patent and that said Letters Patent is hereby corrected as shown below:

Column 3
line 40, delete "signal" and insert --signals--
line 65, delete "output" and insert --output.--

Column 5
line 2, before "N x D", insert --the--
line 4, delete "N + D + M" and insert --N x D + M--
line 9, before "same", insert --the--
line 26, delete "decode" and insert --decoded--
line 39, delete "1st" and insert --first--
line 43, delete "2d" and insert --second--
line 44, delete "2d" and insert --second--

Column 7
line 22, delete "In" and insert --It--
line 66, delete "symbold" and insert --symbol--

Column 8
line 3, delete "N 3 D" and insert --N x D--
line 45, delete "N 3 D" and insert --N x D--
line 46, delete "N 3 D" and insert --N x D--
line 47, delete "N 3 D" and insert --N x D--
line 52, delete "N 3 D" and insert --N x D--

Signed and Sealed this

Twenty-seventh Day of May, 2008

JON W. DUDAS
*Director of the United States Patent and Trademark Office*